Dec. 20, 1932.  F. RICKS  1,891,271
CHANNELING MACHINE
Filed July 9, 1930
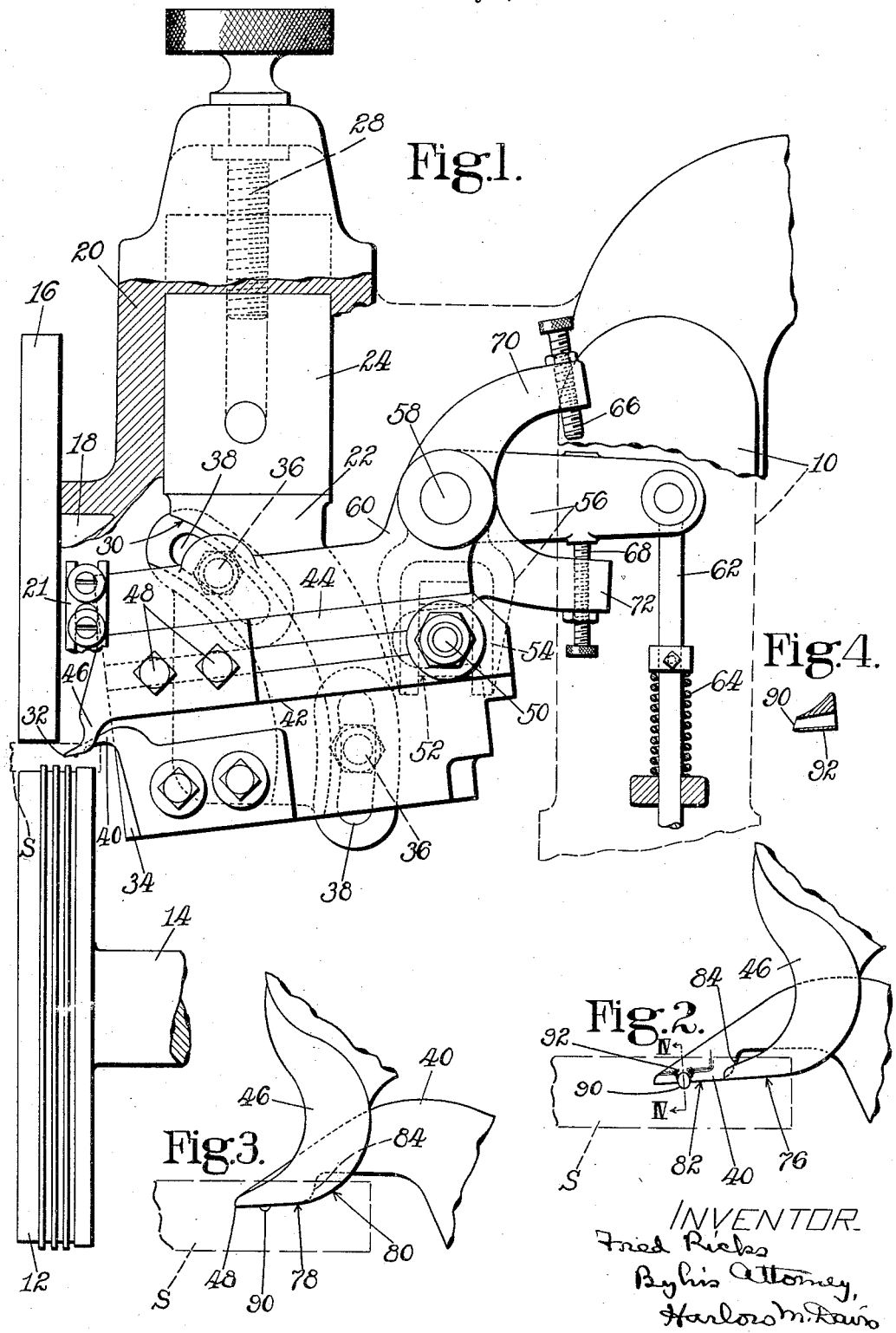

Patented Dec. 20, 1932

1,891,271

UNITED STATES PATENT OFFICE

FRED RICKS, OF LEICESTER, ENGLAND, ASSIGNOR TO UNITED SHOE MACHINERY CORPORATION, OF PATERSON, NEW JERSEY, A CORPORATION OF NEW JERSEY

CHANNELING MACHINE

Application filed July 9, 1930, Serial No. 466,616, and in Great Britain July 16, 1929.

This invention relates to improvements in channeling machines. The invention is herein illustrated as embodied in a machine especially designed to form in a sole a continuous channel which is of the English type around the forepart of the sole and of the American type along the shank portion of the sole, such an operation being referred to hereinafter as "two-type channeling".

A so-called English type channel is one which is cut inwardly from the tread face of the sole and is usually curved transversely at its outer or entrant portion, while a so-called American type channel is one which is cut inwardly from the edge face of the sole or from the corner formed by the junction of the edge face with the tread face of the sole, a channel of this type being usually straight throughout its width. It is sometimes desirable to channel the forepart of a sole with an English channel and the shank portion of the sole with an American channel and to cause the English and American type channels to merge or blend together at the junction of the shank and forepart of the sole. A machine for effecting two-type channeling of this sort is disclosed in a co-pending application Serial No. 362,964, filed May 14, 1929, in the name of Arthur Bates.

One object of the present invention is still further to improve and simplify the construction and mode of operation of two-type channeling machines of the type just referred to, in order to insure greater efficiency of operation of the machines and further to facilitate economy in the manufacture of shoes the soles of which have different types of channels in different portions thereof.

In view of the foregoing, one feature of the invention consists in the provision, in a channeling machine, of two knives constructed and arranged to co-operate in cutting a channel of one type at one part of a sole and to co-operate also in cutting a channel of another type at another part of the sole, the knives being relatively movable to enable one of them to mask a cutting operation of the other during the cutting of the channel at one of said parts of the sole.

The illustrated machine is provided with a fixed knife having a straight cutting edge for cutting the inner portion of an American channel, i. e., the part which is nearer the bottom or region of deepest penetration of the channel cut, and with a movable knife for cutting an English channel, the movable knife having a cutting edge a portion of which is straight and a portion of which is curved, and being movable from a position in which it is adapted to form an English channel, as above described, to another position in which the straight portion only of its cutting edge is positioned in line with the straight cutting edge of the fixed knife to co-operate with the latter in the cutting of an American channel. In the operation of the illustrated machine fitted with the two knives above described, the movable knife occupies its outer position, as the channeling along one side of the shank commences, and it functions at this time to cut the outer portion of the American channel while, at the same time, the fixed knife cuts the inner portion of the American channel. When the channeling has proceeded to the vicinity of the ball line, however, the movable knife is shifted to its inner position wherein it is located in front of the fixed knife so that it completely masks the channel cutting edge of the latter and thus the fixed knife, while still remaining in cutting position, is rendered ineffective to cut the sole. While occupying its inner position, the movable knife functions to cut the English channel around the forepart of the sole. When the channeling operation approaches the ball line at the opposite side of the sole from that first operated upon the movable knife is retracted to its outer position, after which the movable and fixed knives co-operate in the same manner as that hereinbefore described to cut an American channel along this side of the shank portion of the sole. Thus, there is formed a continuous channel which is of the American type at opposite sides of the shank and of the English type around the forepart and in which the American and English portions of the channel are gradually blended together at the junction of the shank and forepart at opposite sides of the sole. Moreover, the channeling is accomplished in a single continuing operation by the use of two knives, only one of which is moved for the purpose of changing the type of channel being cut. The machine is thus materially simplified in construction as well as made more efficient and reliable in operation.

The invention further consists in improvements in grooving knife construction and in other improved features of construction hereinafter described and claimed, the advantages of which will be apparent to those skilled in the art.

In the drawing:

Fig. 1 is a view in front elevation, with portions broken away, of so much of a channeling machine as is necessary to illustrate the application of the present invention thereto;

Fig. 2 is a detailed view, on an enlarged scale, of the fixed and movable channel knives, the movable knife being shown in the outer position which it occupies when co-operating with the fixed knife in the cutting of an American channel in a sole;

Fig. 3 is a view similar to Fig. 2 but showing the movable knife in the inner position which it occupies during the cutting of an English channel; and Fig. 4 is a section on the line IV—IV of Fig. 2.

Referring to the drawing, the invention is shown in Fig. 1 as embodied in a machine of the type known as a McKay channeler, such a machine being disclosed, for example, in United States Letters Patent No. 663,050, granted Dec. 4, 1900, upon application of C. P. Stanbon. The illustrated machine comprises a frame a portion of which is shown at 10, a lower feed wheel 12 carried by a horizontal feed wheel shaft 14, an upper feed or presser roll 16 carried by a shaft 18 journaled in a pivotally mounted head 20, and a presser foot 21 which is fixedly secured to the head 20. The above-described parts are similar in construction to corresponding parts disclosed in the above-mentioned Patent No. 663,050, with this exception, viz., that the head 20 of the illustrated machine is shaped somewhat differently from that of the corresponding parts shown in said patent in order to provide room for novel operating parts hereinafter to be described. The mode of operation of the moving parts already referred to is the same as that of corresponding parts shown in said patent and reference may be had to the patent for particulars of construction and operation not herein specifically described.

Mounted in the head 20 of the illustrated machine is a channel knife carrier 22 which is formed at the lower end of a stem 24 that is mounted for up-and-down adjustment in the head 20, a screw 28 with a knurled head being provided for effecting the adjustment and for securing the knife carrier 22 in adjusted position. The knife carrier 22 is provided with an arcuate guideway 30 curved about a center 32 located approximately at the point of a fixed channel knife hereinafter to be referred to. Adjustably mounted in the guideway 30 is a knife block 34 which is fixed in adjusted position by means of two screws 36, the shanks of which extend through arcuate slots 38 in the knife carrier 22, and have threaded engagement with the knife block. Upon the front face of the knife block 34 is adjustably secured a fixed channel knife 40 the point of which is located approximately at the center of curvature 32 of the arcuate guideway 30, this knife cutting only when an American type channel is being formed although it remains always in channel cutting position.

The knife carrier 22 is provided with a straight guideway 42 in which there is mounted for reciprocation toward and from a sole, such as the sole S shown in the drawing, a slide 44 to which a movable, English type channel knife 46 is fixedly secured by means of screws 48. The knife block 34 is adjusted in the arcuate guideway 38 so that the straight guideway 42 is parallel to the direction of crosswise inclination of the American channel which is to be cut in the sole.

For the purpose of moving the slide 44 to render the movable knife 46 effective or ineffective, the rear end of the slide 44 has fixed to it a pivot pin 50 on which is pivoted a rectangular block 52 that is embraced by a fork 54 formed as the lower arm of a bell crank lever 56 fulcrumed upon a stud 58 carried by a boss 60 projecting upwardly from the rear of the knife block 34. The upper arm of the bell crank lever 56 is connected to a treadle rod 62 which is normally held in an upper position by a spring 64 so that the upper arm of the bell crank lever is held against, and its upward movement limited by, an adjustable stop 66. Downward movement of the upper arm of the bell crank lever 56 is limited by a second adjustable stop 68. The stops 66 and 68 are carried by brackets 70 and 72 extending from the knife block 34.

The movable channel knife 46 is shaped like the usual English channel knife having a cutting edge 76 which is straight from the tip of the knife to the point 78 (Fig. 3) and which curves upwardly from the point 78 as shown at 80. The fixed channel knife 40 has a straight front cutting edge 82 of about the same length as the straight portion 76 of the front cutting edge of the movable knife 46, while the rest of the front portion of the fixed or American knife 40 is curved upwardly, as shown at 84, somewhat like the corresponding portion of the English knife except that this curved portion 84 of the fixed knife is not a cutting edge but is blunt.

The arrangement is such that when an American channel is to be cut the treadle connected with the treadle rod 62 is not depressed, with the result that the upper arm of the bell crank lever 56 is held by the spring 64 against the stop 66 and the English channel knife 46 is held in its right-hand position (Fig. 2) in which position it will cut the outer portion of an American channel by means of the straight part 76 of its front edge (see Fig. 2), the flap or channel lip cut on the sole by the portion 76 of the knife being lifted up by the thicker rear part of the knife 46 so as to cause the flap to pass over the curved blunt part of the fixed channel knife 40 which part of the latter is then behind the straight part of the English knife 46. The inner portion of the American channel is cut by the straight-edged front part of the fixed channel knife 40 (see Fig. 2).

When an English channel is to be cut the treadle connected with the rod 62 is depressed and the movable English channel knife 46 is advanced, or moved toward the left in Fig. 1, into position to cut an English channel in the usual manner. When in the advanced position just referred to the English knife 46 will wholly mask the fixed or American knife 40, which is then behind it, thus rendering the American knife ineffective (so far as any channeling is concerned) and causing it merely to track idly in the English channel which is being cut by the knife 46. The movement of the knife 46 is effected gradually enough, relatively to the rate of feed of the sole, to insure a smooth blending together of the American and English portions of the channel, the movement of the knife 46 causing the entrant portion of the channel to cut across the corner of the sole edge where the two types of channel cuts merge or blend.

If it is desired to form a stitch-receiving groove along the whole length of the channel a grooving portion may be formed in the front cutting edge 82 of the fixed channel knife 40 a little way from its end corner. This may be a diminutive U-shaped edge depressed below the level of the front cutting edge 82 so as not to be masked (as is the front cutting edge proper) by the English channel knife 46 when the latter comes into English channel cutting position. To avoid, as is preferable, the formation on the under side of the channel flap of a rib corresponding to the groove in the body of the sole, the cutting edge 82 of the knife 40 preferably has incorporated in it, instead of merely a U-shaped edge portion, an endless cutting edge 90 (Figs. 2 and 4) (partly above and partly below the said front edge), this annular edge being formed on the end of a tubular portion 92 so that, in the course of the channeling along the shank portion of the sole, this annular cutting edge shall insure the actual removal from the sole of a strip of leather in making the groove just as in the forepart channeling the lower U-portion of the annular cutting edge (or the U-portion of the simpler alternative arrangement just referred to) of the fixed knife and the straight part of the front cutting edge of the English channel knife co-operate to remove a strip from the sole to leave ultimately a stitch-receiving groove in the closed channel of the channeled sole. It will be understood that a fixed tubular grooving tool is thus provided having an endless cutting edge, more or less of which is exposed, and thus made effective for cutting purposes, according to the position which the knife 46 occupies relatively to the grooving tool, the full extent of the annular cutting edge of the grooving tool being exposed when the knife 46 is positioned for cutting the outer portion of the American channel and the lower portion only of the cutting edge of the grooving tool being exposed when the knife 46 is positioned for the cutting of the English channel.

In order to insure, as far as practicable, that the grooving tool or, in other words, the groove forming portion 90 of the cutting edge of the knife 40, shall operate along the shank portion of a sole (where it is not partially masked by the knife 46) without cutting into and removing material from the under side of the channel flap, the following novel features of construction have been embodied in the groove-forming portion of the knife 40. The sharp endless cutting edge 90 is beveled upwardly and away from the front of the machine so that the lowest point of such edge is located in advance of the upper portion thereof, having regard to the direction of work feed, and thus the lower portion of the cutting edge first meets the advancing work (see Fig. 4). As shown in Fig. 2, this gives to the opening of the tubular portion 92 an elliptical form the major axis of which extends upwardly. Moreover, the thickness of the wall of the upper portion of the groover tube 92 is made to increase progressively from the cutting edge 90 rearwardly (see Fig. 4) so that the upper surface of the groover has a more marked tendency to raise the channel flap just back of the cutting locality. By either of the above expedients, or by the joint use of both of them, it becomes possible to render the upper portion of the cutting edge 90 ineffective to cut into the channel flap, at least to any damaging extent. As shown, also, the passage through the tubular portion 92 has been made more or less tapering toward its cutting edge 90 to provide clearance for the ready passage of the strip, cut by the groover, through the said passage.

The operation of the above-described machine is as follows: The knife block 34 is adjusted in the arcuate guideway 30 until the slide 44 is parallel with the depthwise direction in which it is desired to cut the American channel and is fixed in that position by means of the screws 36. The two knives 40 and 46 are relatively adjusted and clamped, the one to the knife block 34 and the other to the slide 44, the straight part 76 of the front cutting edge of the English channel knife 46 being set in line with the front cutting edge of the fixed channel knife 40, as shown in Fig. 2, and the knives are together adjusted in correct vertical position by means of the screw 28. The sole is then entered between the feed wheel 12 and the presser roll 16 and channeling along the shank portion of the sole commences, the outer portion of the channel being cut by the English channel knife 46 and the inner portion of the channel being cut by the fixed American knife 40. When the forepart of the sole is reached the treadle is depressed to lower the rod 62, whereupon the English channel knife 46 is moved rectilinearly toward the left (in the direction in which the cutting edge 82 of the fixed knife 40 extends, see Fig. 1) so that the front left-hand corner of the English knife 46 comes directly in front of the front left-hand corner of the fixed knife 40, as shown in Fig. 3. Thereafter the knife 46 cuts an English channel around the forepart of the sole, the fixed knife 40 tracking idly in the English channel behind the English channel knife during the cutting of the English channel. When the shank portion at the other side of the sole is reached the treadle is released to raise the treadle rod 62, whereupon the English channel knife 46 moves rectilinearly toward the right until it reassumes the position shown in Fig. 2, and an American channel is cut by the co-action of the two knives 40 and 46 along the shank on this side of the sole also. The shifting movements of the knife 46 effect a blending together of the American and English portions of the channel at the junction of the shank and forepart portions of the sole.

A machine as described with reference to Fig. 1, but with the fixed American knife 40 removed so that only the movable English knife 46 remains therein, may be used to cut, as hereinbefore described, along each lateral margin of the shank and around the forepart of a sole to form, in a single continuing operation, a continuous channel which is of the English type at the forepart and of the American type, and of part depth only, at the shank of the sole. In my co-pending application Serial No. 466,617, filed of even date herewith, there is disclosed such a machine, having only a single movable knife therein, for use in the practice of an improved method of sole fitting described and claimed in that application.

Having described my invention, what I claim as new and desire to secure by Letters Patent of the United States is:

1. In a channeling machine, two knives constructed and arranged to co-operate in cutting a channel of one type at one part of a sole and to co-operate also in cutting a channel of another type at another part of the sole, said knives being relatively movable to enable one of them to mask a cutting portion of the other during the cutting of the channel at one of said parts of the sole.

2. In a channeling machine, two knives constructed and arranged to co-operate in cutting a channel of the English type at one part of a sole and to co-operate also in cutting a channel of the American type at another part of the sole, said knives being relatively movable to enable one of them to mask a cutting portion of the other during the cutting of the channel at one of said parts of the sole.

3. In a channeling machine, two knives adapted to co-operate in cutting a channel which is of the English type at one part of a sole and of the American type at another part of the sole, each of said knives being adapted to remain in the channel throughout the channeling operation, and one of said knives being movable to enable it to mask a cutting portion of the other knife during the cutting of the channel at one of said parts of the sole.

4. In a channeling machine, two knives adapted to co-operate in cutting a channel of the American type in one part of the sole, said knives being relatively movable to enable one of them to cut a channel of the English type in another part of the sole and to mask a cutting portion of the other knife during the cutting of the English type portion of the channel.

5. In a channeling machine, a knife adapted to cut a portion only of the depth of a channel of the American type in one part of a sole, and a second knife adapted to cooperate with the first knife to complete the cutting of said channel, one of said knives being movable in the direction of the length of its cutting edge to adapt it to cut a channel of the English type in another portion of the sole and to render the other knife ineffective to cut the sole.

6. In a channeling machine, a fixed knife constructed and arranged to cut the inner portion only of a channel of the American type in one part of a sole, and a knife movable between two positions and adapted when in one position to cut the outer portion only of said channel and when in another position to cut a channel of the English type in another part of the sole.

7. In a channeling machine, a fixed knife adapted to cut a portion only of the depth of an American channel in one part of a sole, and a second knife movable between two positions in one of which it is adapted to co-operate with the first knife to complete the cutting of said channel and in the other of which it is adapted to cut an English channel in another portion of the sole and to render the other knife ineffective to cut the sole.

8. In a channeling machine, a fixed knife adapted to cut a portion only of the depth of an American channel in one part of a sole, a movable knife having a straight cutting portion and a curved cutting portion, and means for moving said movable knife from a position in which its cutting edge is in line with that of said fixed knife thus adapting said movable knife to co-operate with said fixed knife in the cutting of an American channel of full depth in the sole, to a position in front of said fixed knife to mask the latter and to operate independently thereof to cut an English channel in the sole.

9. In a channeling machine, a fixed knife having a straight cutting edge adapted to cut the inner portion only of a channel of the American type in one part of a sole, and a second knife having a straight cutting portion and a curved cutting portion, the second knife being movable between two positions in one of which its straight cutting portion is adapted to co-operate with the first knife to complete the cutting of said channel while in the other of said positions the second knife is adapted to cut a completely formed channel of the English type in another portion of the sole and to mask the fixed knife to render the latter ineffective to cut the sole.

10. In a channeling machine, a fixed knife having a straight cutting edge adapted to cut the inner portion only of a channel of the American type in one part of a sole, a second knife having a straight cutting portion and a curved cutting portion, the second knife being movable between two positions in one of which its straight cutting portion is adapted to co-operate with the first knife to complete the cutting of said channel while in the other of said positions the second knife is adapted to cut a completely formed channel of the English type in another portion of the sole and to mask the fixed knife to render the latter ineffective to cut the sole, means for feeding a sole to said knives, and means for moving the second knife gradually from one position to another as the sole is being fed to effect a blending together of the American and English types of channels.

11. In a channeling machine, a fixed knife having a straight cutting edge for cutting the inner portion only of a channel of the American type in one part of a sole and a blunt edge portion for assisting in turning up the flap of said channel, and a second knife having a cutting edge partly straight and partly curved, the second knife being movable between two positions in one of which it is adapted to cooperate with the fixed knife to complete said channel of the American type and in the other of which the second knife is operative to cut a channel of the English type in another portion of the sole and to render the first knife ineffective to cut the sole.

12. In a channeling machine, a fixed knife having a straight cutting edge for cutting the inner portion only of a channel of the American type in one part of a sole and an annular cutting portion for forming a stitch-receiving groove in the sole, and a second knife movable between two positions in one of which it is adapted to co-operate with said fixed knife to complete said channel of the American type and to mask the upper portion of said annular cutting portion, while in the other of said positions said second knife is operative to cut a channel of the English type in another portion of the sole.

13. In a channeling machine, a channel knife adapted to be moved in the course of a channeling operation, and a fixed grooving tool more or less of which is rendered effective for grooving purposes according to the position of the channel knife relatively to the grooving tool.

14. In a channeling machine, a grooving tool, and a channel knife mounted for relative movement during the course of a channeling operation to vary the effective cutting action of said grooving tool.

15. In a channeling machine, a grooving tool, and a channel knife adapted to be moved relatively to the grooving tool during a channeling operation to vary the character of the groove formed by the grooving tool.

16. In a channeling machine, a fixed knife having a straight cutting edge for channel cutting purposes, and an annular cutting edge for forming a stitch-receiving groove, and a second channel knife for co-operating with the first channel knife, the second channel knife being adapted for movement during a channeling operation into a position to mask a portion of said annular cutting edge.

17. In a channeling machine, means for feeding a sole through the machine, and a tubular groove forming tool for operating upon the sole as it is being fed, said tool having an endless cutting edge of elliptical form disposed in a plane inclined to the path of the sole so that the portion of the tool which forms the bottom of the groove engages the work in advance of the other portions of the cutting edge of said tool.

18. In a channeling machine, work feeding means, and a tubular groove forming tool having an endless cutting edge disposed in a plane oblique to the longitudinal axis of the tool, said tool having an upper portion which is wedge-shaped in longitudinal section and having the lower portion of its cutting edge located in advance of the upper portion of its cutting edge having regard to the direction of work feed.

In testimony whereof I have signed my name to this specification.

FRED RICKS.